United States Patent [19]

Evans

[11] 4,239,264
[45] Dec. 16, 1980

[54] THERMAL EXPANSION JOINT FOR PIPES

[76] Inventor: Karl K. Evans, 8439 San Gabriel Ave., South Gate, Calif. 90280

[21] Appl. No.: 48,345

[22] Filed: Jun. 14, 1979

[51] Int. Cl.³ ............................................. F16L 51/00
[52] U.S. Cl. .................................... 285/173; 138/120; 138/171; 138/177; 285/187; 285/416; 285/422; 285/DIG. 6; 428/616
[58] Field of Search ................. 285/173, 187, DIG. 6, 285/422, 419, 415, 416, 329; 138/171, 118, 120, 177, 156, 157, 170; 428/616

[56] References Cited

U.S. PATENT DOCUMENTS

| 700,378 | 5/1902 | Schmidt | 285/187 |
|---|---|---|---|
| 2,739,828 | 3/1956 | Schindler et al. | 285/187 X |
| 3,210,098 | 10/1965 | Watts | 285/187 X |
| 3,529,633 | 9/1970 | Vaillancourt | 138/118 |
| 3,632,143 | 1/1972 | Lessmann | 285/187 |
| 3,743,485 | 7/1973 | Gottlieb et al. | 428/616 X |
| 3,746,374 | 7/1973 | Sedgwick et al. | 285/187 |
| 3,970,113 | 7/1976 | Guttinger et al. | 138/171 X |

FOREIGN PATENT DOCUMENTS

| 145370 | 4/1936 | Austria | 138/171 |
| 581645 | 8/1959 | Canada | 285/187 |
| 695223 | 9/1964 | Canada | 285/187 |
| 629117 | 9/1949 | United Kingdom | 428/616 |

Primary Examiner—Thomas F. Callaghan
Attorney, Agent, or Firm—Dominick Nardelli

[57] ABSTRACT

The thermal expansion joint for relieving stresses in a pipe line due to thermal expansion consists of a pair of pipe sections wherein each section has one-half of its wall made of a metal having a higher thermal coefficient of expansion than the thermal coefficient of expansion of another metal forming the other half of the pipe section. The two metals are suitably welded along two axially aligned seams disposed on opposite sides of an axis. The section has suitably designed end flanges which can be coupled to each other and also to a flange on, for example, a standard pipe elbow. When the section is coupled to the standard elbow, the metal with the higher thermal coefficient of expansion is disposed on the opposite side from which the free end of the elbow points. Now, the free end of each elbow is coupled within the pipe line so that the fluid path is a modified "Z". To save space, the pair of sections can be formed into a helix.

4 Claims, 3 Drawing Figures

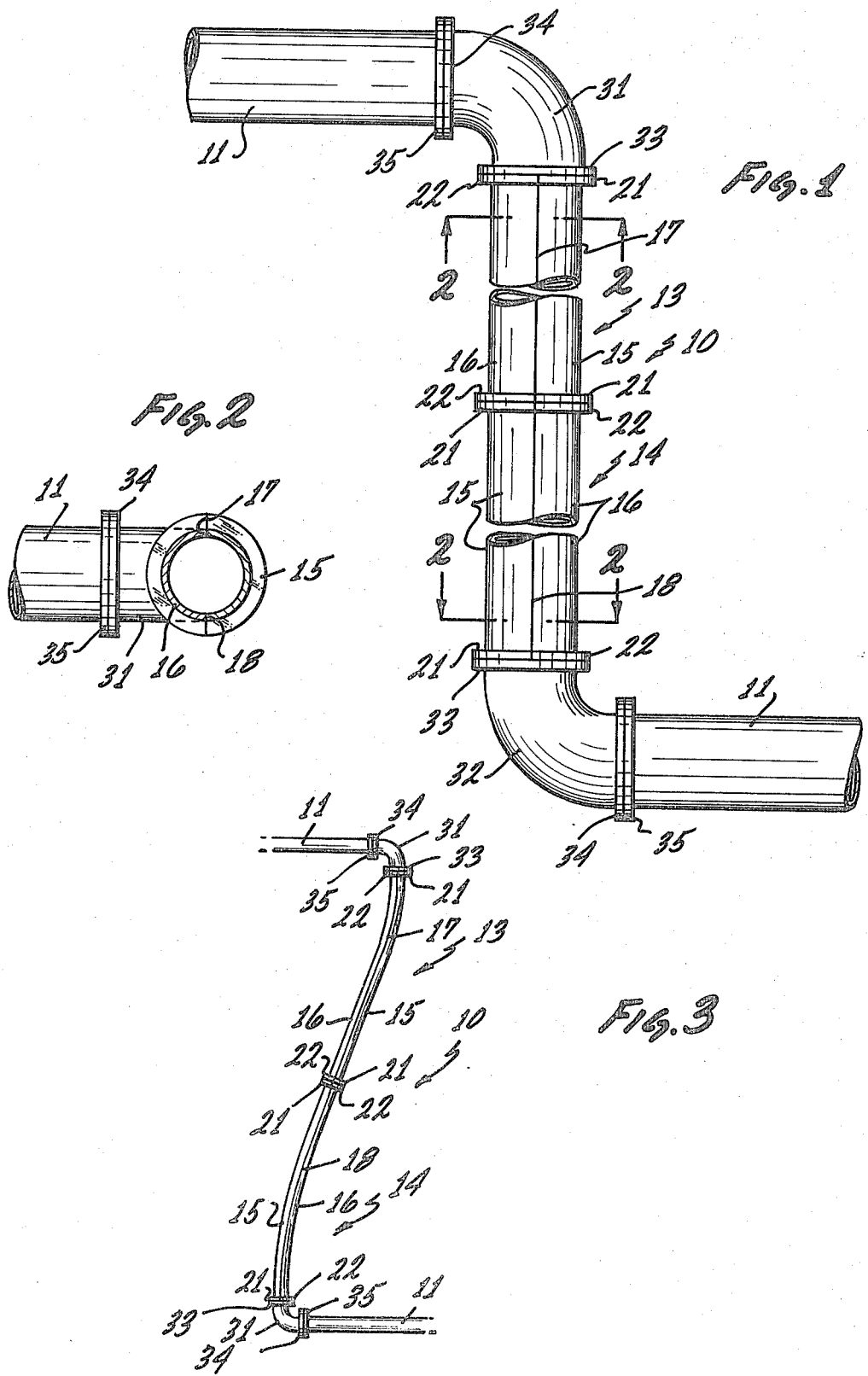

THERMAL EXPANSION JOINT FOR PIPES

FIELD OF THE INVENTION

This invention relates to expansion joint for pipe line and, more particularly, to such joints which provide little or no stress in the line or joint due to thermal expansion.

BACKGROUND OF THE INVENTION

In the past, pipe lines for transporting steam were provided with expansion joints intermittently along the length so that large compress stresses would not build up in the pipe walls. These prior art joints usually were made in the form of a horseshoe, having an elbow fitted on each end to be coupled within the main pipe line so that the steam travelled through the horseshoe shaped section. The horseshoe section was designed so that its ends could move closer together with moderate force, thus relieving the relatively large stresses which may build up in the main pipe line and prevent the pipe line from buckling. However, these stresses are large enough so that the pipe designer had to take them into consideration when he designed the pipe line.

OBJECTS OF THE INVENTION

An object of this invention is to provide an expansion joint which developes practically no stress in the pipe walls.

Another object of this invention is to provide the pipe section for my novel expansion joint assembly wherein one 180° half of the pipe section wall is made of one type of metal, and the other 180° half of the wall is made of another type of metal.

These and other objects and features of advantage will become more apparent after one studies the following description of the preferred embodiment of my invention, together with the appended drawing.

BRIEF DESCRIPTION OF THE DRAWING

FIG. 1 is a plan view of my novel thermal expansion joint assembly lying preferably in a plane, as shown, and at ambient temperature.

FIG. 2 is a section taken on either lines 2—2 of FIG. 1 in the direction of the arrows.

FIG. 3 is a view of my joint of FIG. 1 shown in a smaller scale and at an elevated temperature than at ambient temperature.

DETAILED DESCRIPTION OF THE DRAWING

Referring to FIGS. 1 and 2, my expansion joint 10 is coupled between two lengths of the pipe line 11. The joint 10 has preferably two pipe sections 13 and 14, each of which has its wall made of two semi-cylindrical walls 15 and 16 welded along seams 17 and 18 to form a tube. At the end of each section is formed a flange which is made of two semi-circular rings 21 and 22. Semi-cylindrical walls 15 and semi-circular rings 21 are made of the same metal and semi-cylindrical walls 16 and semi-circular rings 22 are also made of the same metal, which metal is different than the first mentioned metal, because the coefficient of thermal expansion of the latter metal is less than the coefficient of thermal expansion of the first mentioned metal. The two dissimilar metals are welded or brazed so that preferably a transition zone is provided at seams 17 and 18 by a well known process.

It is now obvious that, as the temperature of sections 13 and 14 rises, these sections will arch.

To make use of this arching effect, the sections 13 and 14 are coupled by their respective flanges together so that wall 15 on section 13 is oriented 180° around the axis from wall 15 on section 14. Of course, semi-ring 21 on section 13 is also so oriented with respect to the semi-ring 21 on section 14. The sections 13 and 14 are coupled to the respective lengths of pipe line 11 with the aid of two elbows 31 and 32 so that the metal with the higher thermal coefficient of expansion is disposed on the outside of the respective elbow 31 or 32, or opposite the direction in which the other open end of the elbow points. Elbows 31 and 32 have suitable flanges 33 and 34 with flange 33 butting the flange consisting of semi-rings 21 and 22 and with flange 34 butting a suitable respective flange 35 on pipe line 11. One understands that although this embodiment shows sections 13 and 14 in the same plane as pipe line 11, the sections 13 and 14 may be formed in a helix. However, whether formed into a helix or any other shape, a line perpendicular to the axis of the sections 13 and 14 and passing through the seams 17 and 18 should be oriented perpendicular to the axis of the pipe line 11 so that, as the temperature of the pipe line increases, flanges 35 move towards each other and, if necessary, may pass each other as shown in FIG. 3. FIG. 3 shows the pipe line above ambient temperature, and sections 13 and 14 now assume an arch, as shown, and therefore with proper design at all temperatures no stresses will build up in the pipe line. Although the two sections 13 and 14 are described in this embodiment, under some circumstances, one could design an expansion joint using only one of the sections 13 or 14.

Preferably, pipe line 11 and elbows 31 and 32 are each made of one metal, and preferably of the same metal. To compensate for unequal expansion in the radial direction, the flanges 33, and the flanges made of semi-rings 21 and 22 may incorporate the teachings of U.S. Pat. Nos. 2,739,828; 3,210,098; 3,632,143; or 3,746,374. In addition, one could dispense with the flanges and weld or otherwise bond the respective items together in a well known manner.

Having described the preferred embodiment of my invention, one skilled in the art, after studying the description of the preferred embodiment, could devise other embodiments without departing from the spirit of my invention. Therefore, my invention is not to be considered as limited to the described embodiment, but includes all embodiments falling within the embodiment of the appended claims.

I claim:

1. In a pipe line formed in two lengths, an expansion joint comprising:
   a pipe section having a wall made of two semi-cylindrical metallic wall parts wherein one wall part is made of a metal having a higher coefficient of thermal expansion than the coefficient of thermal expansion of the metal forming the other wall part;
   an elbow coupled at each end of said pipe section;
   one of said elbows being coupled to one of said lengths of said pipe line so that said section forms an angle with said one length and the metal with the higher thermal coefficient of expansion is disposed on the outside of said one elbow; and
   the other of said elbows being coupled to the other length of said pipe length pipe line and also to said pipe section.

2. In the pipe line of claim 1 wherein said joint further comprises:
another pipe section similar to said first mentioned pipe section;
said other pipe section is coupled between said first mentioned pipe section and said other elbow so that said other pipe section forms an angle with said other length and the metal with the higher thermal coefficient of expansion is disposed on the outside of said other elbow and disposed 180° around from the metal with the higher thermal coefficient of the first mentioned pipe section.

3. In the pipe line of claim 2 wherein:
flanges are provided on each pipe section and said elbows;
said flanges of said pipe sections are comprised of two semi-rings, one of which is made of said metal with the higher thermal coefficient of expansion and the other semi-ring is made of said metal with the lower thermal coefficient of expansion; and
said metals having the same thermal expansion coefficient on said flanges are welded to the same respective metal on said wall parts of said pipe sections.

4. A pipe section comprising:
a first semi-cylindrical wall; and
a second semi-cylindrical wall bonded to said first semi-cylindrical wall to form a tubular member; and
said first semi-cylindrical wall is formed of a metal with a higher thermal coefficient of expansion than the thermal coefficient of expansion of the metal forming said second semi-cylindrical wall.

* * * * *